United States Patent
Iyer et al.

(10) Patent No.: US 10,162,918 B1
(45) Date of Patent: Dec. 25, 2018

(54) INTEGRATED CIRCUIT RETIMING WITH SELECTIVE MODELING OF FLIP-FLOP SECONDARY SIGNALS

(71) Applicant: Altera Corporation, San Jose, CA (US)

(72) Inventors: Mahesh A. Iyer, Fremont, CA (US); Vasudeva M. Kamath, San Jose, CA (US); Robert Walker, Boulder, CO (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 15/140,327

(22) Filed: Apr. 27, 2016

(51) Int. Cl.
*G06F 17/00* (2006.01)
*G06F 17/50* (2006.01)
*H04J 3/06* (2006.01)

(52) U.S. Cl.
CPC ...... *G06F 17/5045* (2013.01); *G06F 17/5031* (2013.01); *H04J 3/0685* (2013.01); *G06F 2217/62* (2013.01)

(58) Field of Classification Search
USPC ....................................................... 716/108
See application file for complete search history.

(56) References Cited

U.S. PATENT DOCUMENTS

| | | | |
|---|---|---|---|
| 6,958,627 B2 | 10/2005 | Singh et al. | |
| 7,020,397 B2 | 3/2006 | Lemoff et al. | |
| 7,120,083 B2 | 10/2006 | Ko | |
| 7,120,833 B2 | 10/2006 | Kinderman et al. | |
| 7,203,915 B2 | 4/2007 | Baumgartner et al. | |
| 7,203,919 B2 | 4/2007 | Suaris et al. | |
| 7,360,190 B1 | 4/2008 | Singh et al. | |
| 7,600,211 B1 | 10/2009 | Goldberg et al. | |
| 7,620,798 B1 | 11/2009 | French et al. | |
| 7,689,955 B1 | 3/2010 | van Antwerpen et al. | |
| 7,917,736 B1 | 3/2011 | French et al. | |
| 7,917,793 B2 | 3/2011 | Chou et al. | |
| 8,099,703 B1 | 1/2012 | Manovit et al. | |

(Continued)

OTHER PUBLICATIONS

Chiu et al., U.S. Appl. No. 14/525,948, filed Oct. 28, 2014.

(Continued)

*Primary Examiner* — Mohammed Alam
(74) *Attorney, Agent, or Firm* — Treyz Law Group, P.C.; Tianyi He

(57) ABSTRACT

An integrated circuit design may include registers and combinational logic. Integrated circuit design computing equipment may perform register retiming in the circuit design, whereby registers are moved across one or more portions of the combinational logic. The candidate registers to be retimed may have a different number or different types of secondary signals. In such scenarios, a selective modeling operation may be performed according to a predetermined precedence scheme to remove and model the differing secondary signals, thereby producing comparable registers with the same number and type of secondary signals. The comparable registers can then be retimed across the corresponding combinational logic. Backward or forward retiming operations may be performed in this way to achieve optimal circuit performance. During retiming adjacent combinational logic may also be combined to help minimize circuit area.

17 Claims, 13 Drawing Sheets

(56) References Cited

U.S. PATENT DOCUMENTS

| | | |
|---|---|---|
| 8,296,695 B1 | 10/2012 | Chen et al. |
| 8,381,142 B1 | 2/2013 | Hutton |
| 8,539,406 B2 | 9/2013 | Mahar et al. |
| 8,813,001 B2 | 4/2014 | Zhou et al. |
| 8,732,653 B1 | 5/2014 | Chen et al. |
| 8,806,399 B1 | 8/2014 | van Antwerpen et al. |
| 8,813,036 B2 | 8/2014 | Tzoref-Brill |
| 8,909,579 B2 | 12/2014 | Ivrii et al. |
| 9,015,012 B2 | 4/2015 | Tzoref-Brill |
| 2002/0156973 A1* | 10/2002 | Ulrich ................ G06F 9/5083 711/114 |
| 2005/0132316 A1 | 6/2005 | Suaris et al. |
| 2005/0251775 A1* | 11/2005 | Wood ................ G06F 17/5036 716/124 |
| 2007/0025483 A1 | 2/2007 | Emami-Neyestanak et al. |
| 2008/0244135 A1* | 10/2008 | Akesson ............ G06F 13/1626 710/241 |
| 2013/0297278 A1 | 11/2013 | Narayanaswamy et al. |
| 2014/0157218 A1 | 6/2014 | Gu et al. |
| 2014/0195480 A1* | 7/2014 | Talagala ............ G06F 12/0804 707/610 |
| 2015/0100929 A1* | 4/2015 | Redekopp ............ G06F 17/505 716/103 |

OTHER PUBLICATIONS

Chiu et al., U.S. Appl. No. 14/726,237, filed May 29, 2015.
Sinnadurai et al., U.S. Appl. No. 14/846,645, filed Sep. 4, 2015.
Gamsa et al., U.S. Appl. No. 14/730,082, filed Jun. 3, 2015.

\* cited by examiner

INTEGRATED CIRCUIT RETIMING WITH SELECTIVE MODELING OF FLIP-FLOP SECONDARY SIGNALS

BACKGROUND

This relates to integrated circuits and, more particularly, to performing register retiming on an integrated circuit design.

Every transition from one technology node to the next has resulted in smaller transistor geometries and thus potentially more functionality implemented per unit area on an integrated circuit die. Synchronous integrated circuits have further benefited from this development as evidenced by reduced interconnect and cell delays, which have led to performance increases.

To further increase the performance, solutions such as register retiming have been proposed, where registers are moved among portions of combinational logic, thereby achieving a more balanced distribution of delays between registers, and thus the integrated circuit may be operated at a potentially higher clock frequency.

The registers are typically implemented using clock-edge-triggered latches commonly known as digital flip-flops. Conventional flip-flops only include a data input terminal, a data output terminal, and a clock terminal. Modern flip-flops, however, can have one or more secondary signals including a clock enable terminal, a synchronous clear terminal, an asynchronous clear terminal, a synchronous data terminal, a synchronous load terminal, etc. Since most retiming algorithms are only designed to work with conventional (simple) flip-flops, these complex flip-flops with one or more secondary signals have to be modeled using a simple flip-flop along with additional gate-level combinational logic.

For example, consider a scenario in which an original circuit design includes a first combinational logic block implemented using a first lookup table (LUT), a second combinational logic block implemented using a second LUT, a third combinational logic block implemented using a third LUT, a first flip-flop coupled between an output of the first LUT and an input of the second LUT, and a second flip-flop coupled between the output of the first LUT and an input of the third LUT. In particular, the first flip-flop has two secondary signals, whereas the second flip-flop has only one secondary signal.

In this scenario, a complete modeling of the first complex flip-flop followed by a backward retiming operation may introduce a fourth LUT and four simple flip-flops. Similarly, a complete modeling of the second complex flip-flop followed by a backward retiming may introduce a fifth LUT and three simple flip-flops. As shown in this example, the retimed circuit will include at least two additional LUTs and five additional flip-flops. The number of additional LUTs and flip-flops will generally depend on which secondary signals are being modeled. A retiming operation of a circuit that includes complex flip-flops having secondary signals therefore often results in huge area penalties that cannot be undone.

It is within this context that the embodiments herein arise.

SUMMARY

This relates generally to integrated circuits and, more particularly, to methods for using integrated circuit design computing equipment to perform register retiming. Computer-aided design (CAD) tools implemented on integrated circuit design computing equipment are often be used to perform register retiming to help improve the overall circuit performance of a circuit design.

In accordance with an embodiment, selective modeling may be performed on a circuit design that includes heterogeneous complex flip-flops having mismatched secondary signals. The design tools may be used to determine whether the candidate flip-flops for retiming have different secondary signals. In response to determining that the candidate flip-flops having mismatched secondary signals, the CAD tools may then be used to perform selective modeling on the candidate flip-flops to produce comparable flip-flops (e.g., flip-flops having the same number and type of secondary signals). Retiming can be performed after the flip-flops have been selectively modeled.

The selective modeling operation may be performed according to a predetermined secondary signal modeling precedence scheme/rule. The candidate flip-flops may have secondary signals including a clock enable signal, a synchronous clear signal, a synchronous data signal, a synchronous load signal, and other suitable secondary signals that can be found in modern complex registers. The clock enable signal may be assigned the highest precedence. The synchronous clear signal may be assigned the next highest precedence. The synchronous data and the synchronous load signals may be assigned the lowest precedence. This particular order of precedence is merely exemplary. If desired, other precedence rules may be used.

The selectively modeling scheme described herein may be adapted for either backward retiming or forward retiming for two or more flip-flops at a common fan-out node or fan-in arrangement. If desired, combinational logic (e.g., combinational logic originally implemented as separate lookup tables) may be merged into a single lookup table during the retiming process to help minimize integrated circuit area while meeting target performance criteria.

Further features of the invention, its nature and various advantages will be more apparent from the accompanying drawings and following detailed description.

DETAILED DESCRIPTION

The presented embodiments relate to integrated circuits and, more particularly, to modeling registers during register retiming operations.

Modern complex digital flip-flops are often provided with additional signals other than the typical data input (D), data output (Q), and clock terminals. These additional signals are sometimes referred to as "secondary" signals. A custom logic design on a programmable integrated circuit can sometimes include different types of flip-flops (i.e., flip-flops with different numbers of secondary signals). Handling heterogeneous types of flip-flips during retiming can be fairly challenging.

Conventional retiming algorithms requires all flip-flops with secondary signals to be modeled using only simple flip-flops (i.e., flip-flops with only D, Q, and clock terminals) and gate-level combinational logic. Creating different gate-level models for different types of flip-flops can while performing retiming can potentially result in substantial area overhead. In some cases, unnecessary modeling of secondary signals can also result in poor circuit performance and prevent the register retiming move itself.

It would therefore be desirable to provide an improved way of modeling heterogeneous types of flip-flops to help meet user timing requirements while minimizing circuit area. In accordance with an embodiment, this can be accomplished by creating minimal gate-level models required to make all the flip-flops comparable while retaining the maximum set of overlapping secondary signals on the flip-flops that are being retimed. Operated in this way, the number of retiming steps can be reduced while offering optimal circuit performing without much area overhead.

It will be recognized by one skilled in the art, that the present exemplary embodiments may be practiced without some or all of these specific details. In other instances, well-known operations have not been described in detail in order not to unnecessarily obscure the present embodiments.

Figure 1:
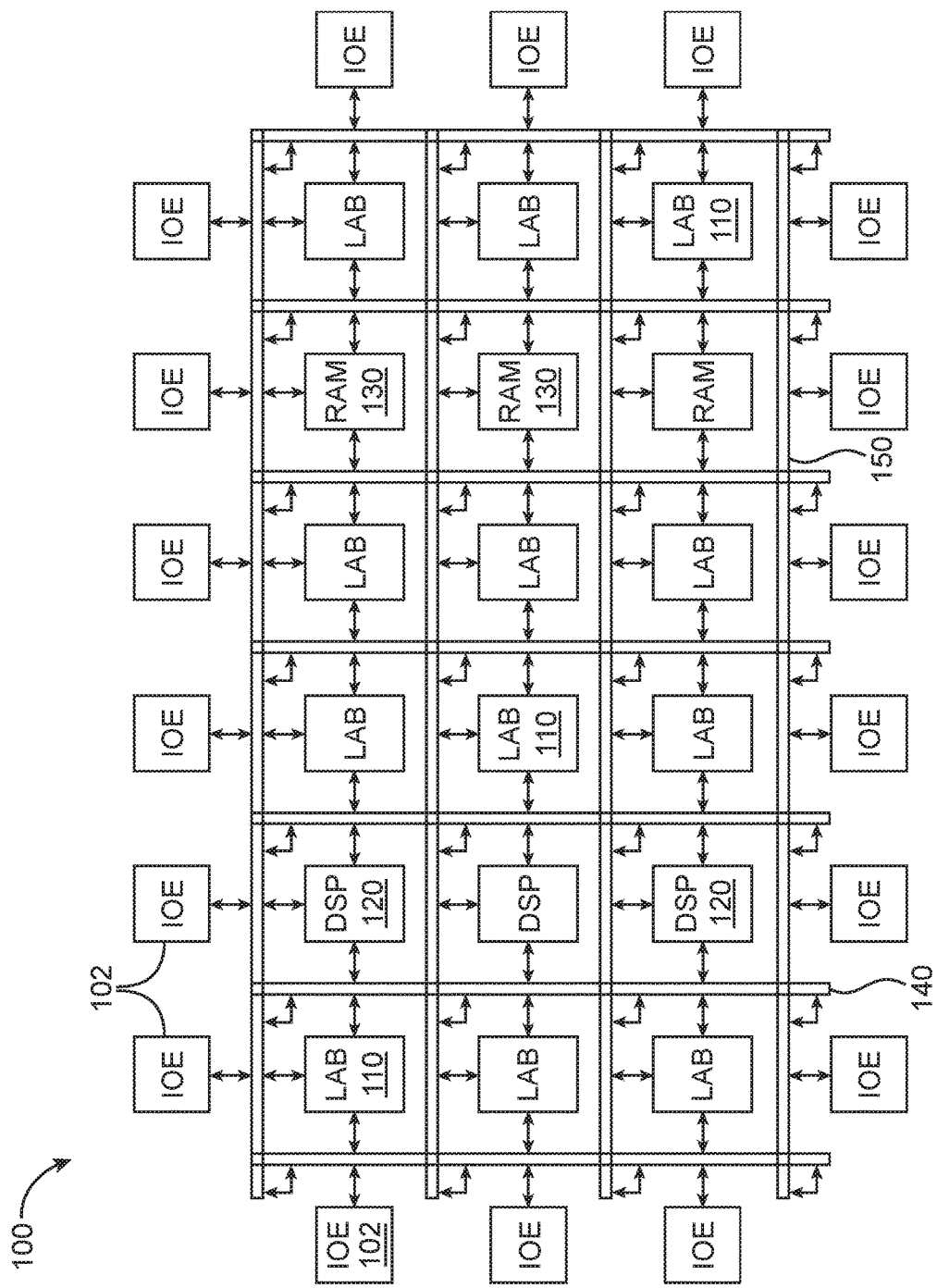
FIG. 1 is a diagram of an illustrative programmable integrated circuit in accordance with an embodiment.

An illustrative embodiment of a programmable integrated circuit such as programmable logic device (PLD) 100 that may be configured to implement a circuit design is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals.

Programmable logic device 100 may contain programmable memory elements. Memory elements may be loaded with configuration data (also called programming data) using input-output elements (IOEs) 102. Once loaded, the memory elements each provide a corresponding static control signal that controls the operation of an associated functional block (e.g., LABs 110, DSP 120, RAM 130, or input-output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration RAM (CRAM), or programmable memory elements.

In addition, the programmable logic device may have input-output elements (ICES) 102 for driving signals off of PLD and for receiving signals from other devices. Input-output elements 102 may include parallel input-output circuitry, serial data transceiver circuitry, differential receiver and transmitter circuitry, or other circuitry used to connect one integrated circuit to another integrated circuit.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

If desired, programmable logic device (PLD) 100 may be configured to implement a custom circuit design. For example, the configuration RAM may be programmed such that LABs 110, DSP 120, and RAM 130, programmable interconnect circuitry (i.e., vertical channels 140 and horizontal channels 150), and the input-output elements 102 form the circuit design implementation.

Figure 2:
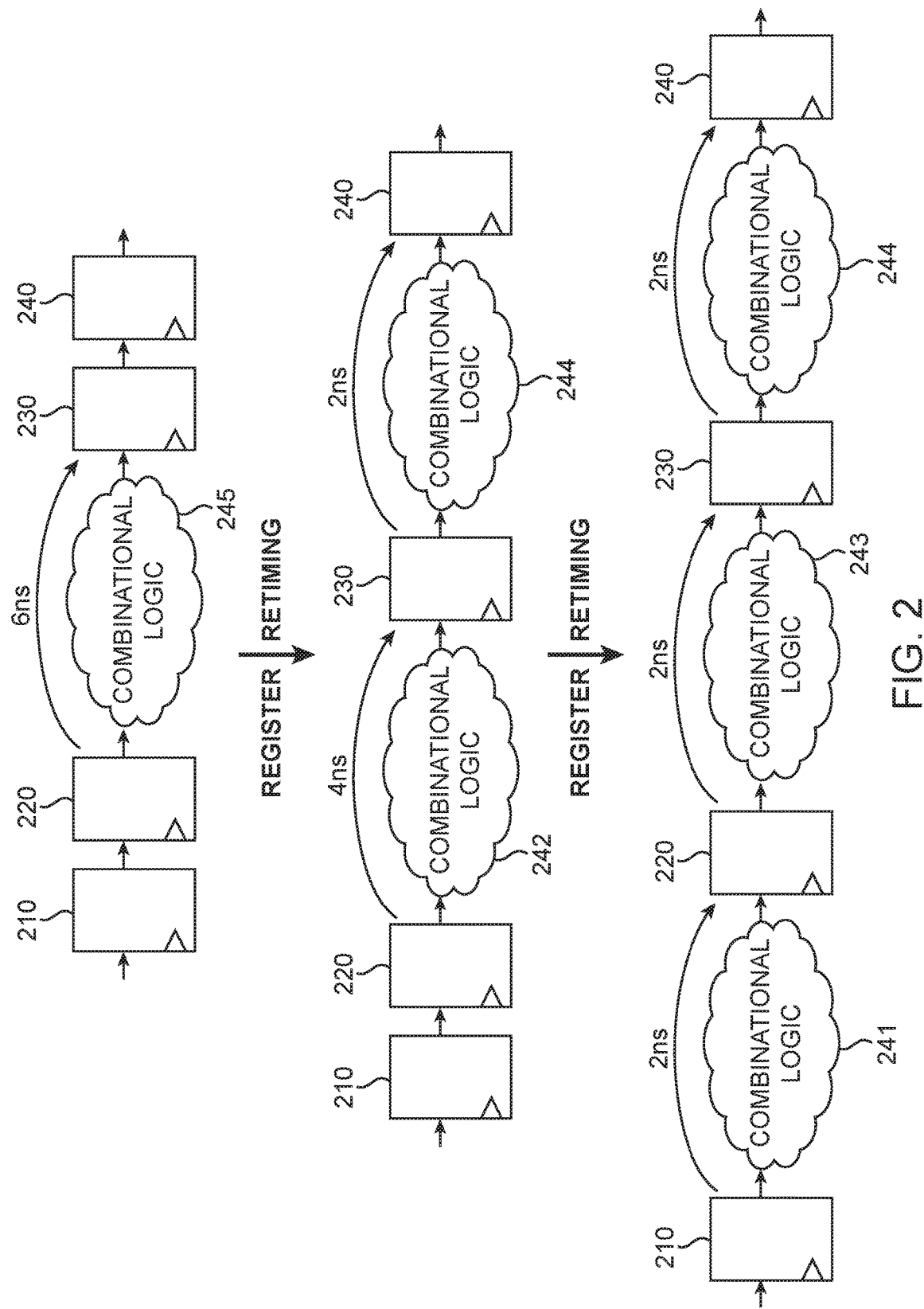
FIG. 2 is a diagram of illustrative retiming operations in accordance with an embodiment.

FIG. 2 shows an example of different versions of a circuit design that PLD 100 may implement. The first version of the circuit design may include registers 210, 220, 230, 240, and combinational logic 245. Register 210 may send a signal to register 220; register 220 may send the signal through combinational logic 245 to register 230; and register 230 may send the signal to register 240. As an example, the delay on the path from register 220 through combinational logic 245 to register 230 may have a delay of 6 nanoseconds (ns), whereas the delay between register 210 and 220 and between registers 230 and 240 may have a delay of 0 ns. Thus, the first version of the circuit design may operate at a frequency of 166 MHz.

Performing register retiming on the first version of the circuit design may create a second version of the circuit design. For example, register 230 may be pushed back through a portion of combinational logic 245 (sometimes referred to as backward retiming), thereby separating combinational logic 245 of the first version of the circuit design into combinational logic 242 and 244 of the second version of the circuit design. In the second version of the circuit design, register 210 may send a signal to register 220; register 220 may send the signal through combinational logic 242 to register 230; and register 230 may send the signal through combinational logic 244 to register 240.

As an example, the delay on the path from register 220 through combinational logic 242 to register 230 may have a delay of 4 ns, and the delay from register 230 through combinational logic 244 to register 240 may have a delay of 2 ns. Thus, the second version of the circuit design may operate at a frequency of 250 MHz, which is limited by the path with the longest delay (sometimes referred to as the critical path).

Performing register retiming on the second version of the circuit design may create a third version of the circuit design. For example, register 220 may be pushed forward through a portion of combinational logic 242 (sometimes referred to as "forward" retiming), thereby separating combinational logic 242 of the second version of the circuit design into combinational logic 241 and 243 of the third version of the circuit design. In the third version of the circuit design, register 210 may send a signal through combinational logic 241 to register 220; register 220 may send the signal through combinational logic 243 to register 230; and register 230 may send the signal through combinational logic 244 to register 240.

As an example, the delay on the paths from register 210 through combinational logic 241 to register 220, from register 220 through combinational logic 243 to register 230, and from register 230 through combinational logic 244 to register 240 may all have a delay of 2 ns. Thus, the third version of the circuit design may operate at a frequency of 500 MHz, which is thrice the frequency at which the first version of the circuit design may operate.

Figure 3:
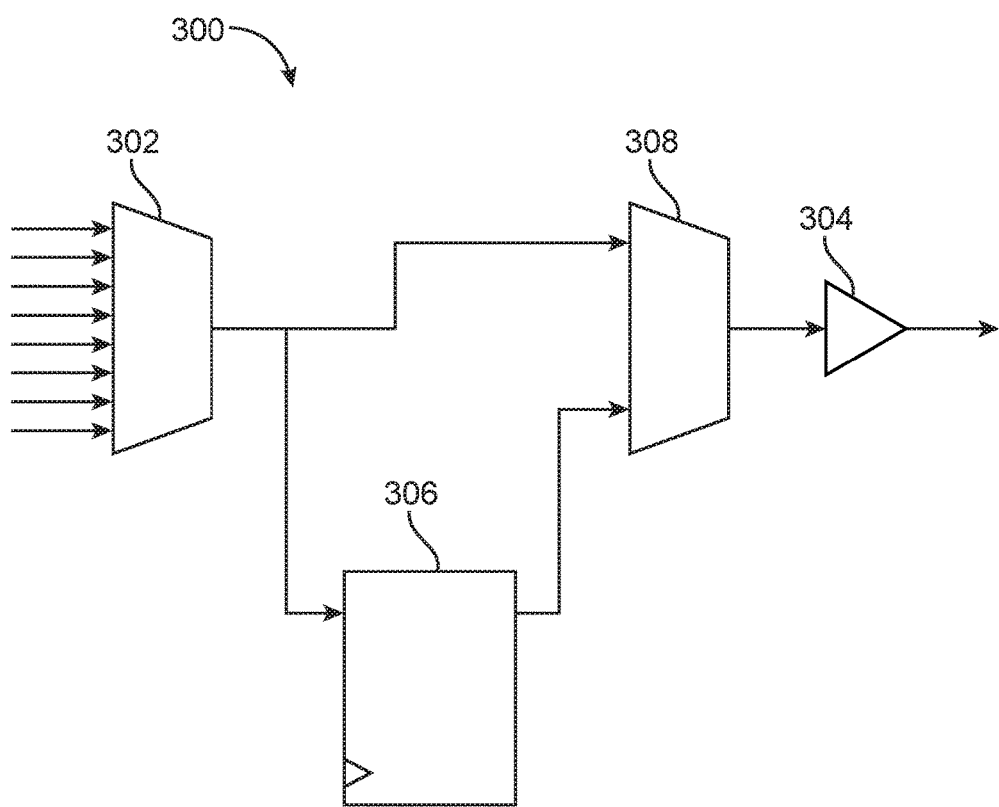
FIG. 3 is a diagram of an illustrative pipelined routing resource which uses a register to pipeline a routing signal in accordance with an embodiment.

If desired, routing resources such as the vertical routing channels 140 or the horizontal routing channels 150 of FIG. 1 may include pipeline elements, which can facilitate register retiming. FIG. 3 depicts a pipelined routing resource 300 which uses a register in accordance with an embodiment. As shown, the pipelined routing resource 300 includes a first multiplexer 302, a driver 304, a register 306, and a second multiplexer 308.

Multiplexer 302 may be a driver input multiplexer (DIM) or a functional block input multiplexer (FBIM). A DIM may select a signal from multiple sources and send the selected signal to driver 304 that drives a corresponding wire. The multiple sources may include signals from outputs of functional blocks and other routing wires that travel in the same or in an orthogonal direction to the wire. A FBIM outputs a signal to a functional block and may select the signal from multiple routing wires.

As shown in FIG. 3, multiplexer 302 may be pipelined by providing its output to the data input of register 306. Multiplexer 308 in pipelined routing resource 300 may receive the output of multiplexer 302 directly and may also receive the data output from register 306.

Although pipelined routing resource 300 includes register 306, it will be recognized by one skilled in the art that different register implementations may be used to store a routing signal such as an edge-triggered flip-flop, a pulse latch, a transparent-low latch, a transparent-high latch, just to name a few. Thus, in order not to unnecessarily obscure the present embodiments, we refer to the storage circuit in the pipelined routing resource as a pipeline storage element.

Multiplexer 308 may enable the pipelined routing resource 300 to be either used in a non-pipeline mode or in a pipeline register mode. In the non-pipeline mode, the output of multiplexer 308 selects the direct output of multiplexer 302. In the pipeline mode, multiplexer 308 may select the output of register 306. Multiplexer 308 may provide its output to driver circuit 304, and the output of driver circuit 304 may be used to drive a routing wire. The routing wire may span multiple functional blocks (e.g., for a pipelined routing resource with a DIM). Alternatively, the routing wire may be inside a functional block (e.g., for a pipelined routing resource with a FBIM).

Every DIM/FBIM may include a register such as register 306 such that all the routing multiplexers are pipelined. However, in some embodiments, that may be unnecessary as the capabilities provided may exceed design requirements. Thus, in certain embodiments only a fraction, such as one-half or one-fourth, of the routing multiplexers may be pipelined. For example, a signal may take 150 picoseconds (ps) to traverse a wire of a given length, but a clock signal may be constrained to operate with a 650 ps clock cycle. Thus, providing a pipeline register such as register 306 every fourth wire may be sufficient in this example. Alternatively the registers may be placed more frequently than every fourth wire (e.g., every second wire) to provide a higher degree of freedom in selection of which registers are used.

Pipelined routing resources such as pipelined routing resource 300 may facilitate register retiming operations, such as the register retiming illustrated in FIG. 2. For example, consider the scenario in which register 230 is implemented by a first instance of a pipelined routing element that is operated in pipeline register mode (i.e., register 230 is implemented by register 306 of a first instance of a pipelined routing resource 300). Consider further that the path from register 220 through combinational logic 245 to register 230 includes a second instance of a pipelined routing element that is operated in non-pipeline mode. Thus, switching the first instance of the pipelined routing element from operating in pipeline register mode to operating in non-pipeline mode and switching the second instance of the pipelined routing element from operating in non-pipeline mode to operating in pipeline register mode may transform the first version into the second version of the circuit design presented in FIG. 2.

Computer-aided design (CAD) tools in a circuit design system may evaluate whether register retiming may improve the performance of a current version of a circuit design or whether the current version of the circuit design meets a given performance criterion. If desired, and in the event that the CAD tools determine that register retiming would improve the performance of the current version of the circuit design or that the current version of the circuit design misses the given performance criterion, the CAD tools may execute register retiming operations that transform the current version of the circuit design into another version of the circuit design (e.g., as illustrated in FIG. 2).

Figure 4:
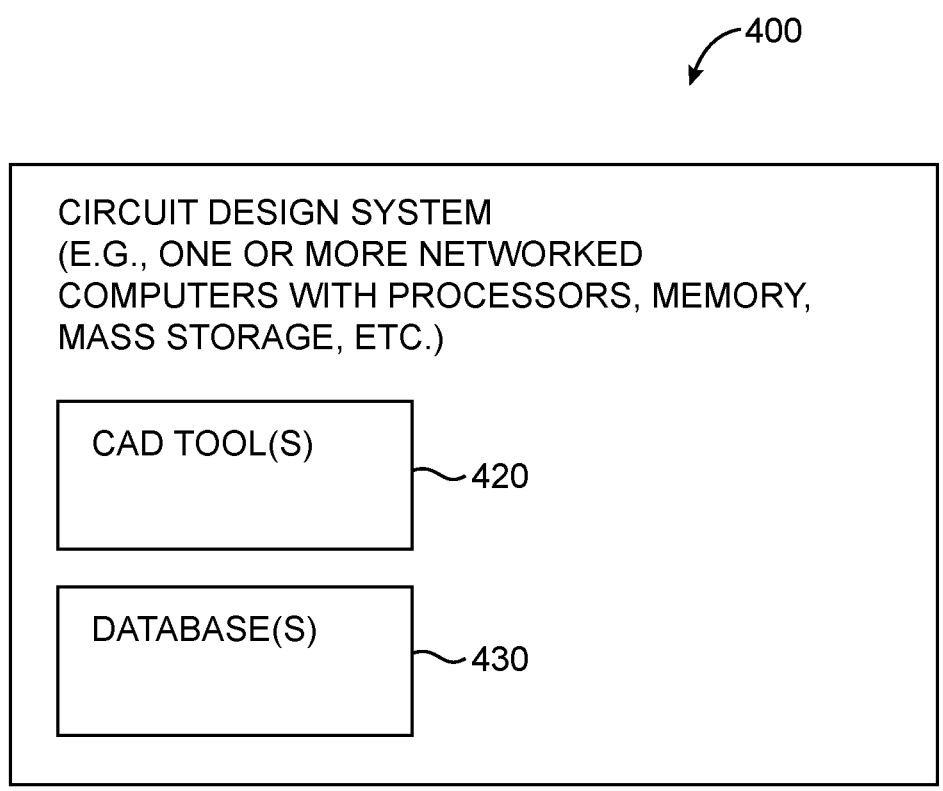
FIG. 4 is a diagram of a circuit design system that may be used to design integrated circuits in accordance with an embodiment.

An illustrative circuit design system 400 in accordance with an embodiment is shown in FIG. 4. Circuit design system 400 may be implemented on integrated circuit design computing equipment. For example, system 400 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 420 and databases 430 reside on system 400. During operation, executable software such as the software of computer aided design tools 420 runs on the processor(s) of system 400. Databases 430 are used to store data for the operation of system 400. In general, software and data may be stored on any computer-readable medium (storage) in system 400. Such storage may include computer memory chips, removable and fixed media such as hard disk drives, flash memory, compact discs (CDs), digital versatile discs (DVDs), Blu-ray discs (BDs), other optical media, and floppy diskettes, tapes, or any other suitable memory or storage device(s). When the software of system 400 is installed, the storage of system 400 has instructions and data that cause the computing equipment in system 400 to execute various methods (processes). When performing these processes, the computing equipment is configured to implement the functions of the circuit design system.

The computer aided design (CAD) tools 420, some or all of which are sometimes referred to collectively as a CAD tool, a circuit design tool, or an electronic design automation (EDA) tool, may be provided by a single vendor or by multiple vendors. Tools 420 may be provided as one or more suites of tools (e.g., a compiler suite for performing tasks associated with implementing a circuit design in a programmable logic device) and/or as one or more separate software components (tools). Database(s) 430 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 5:
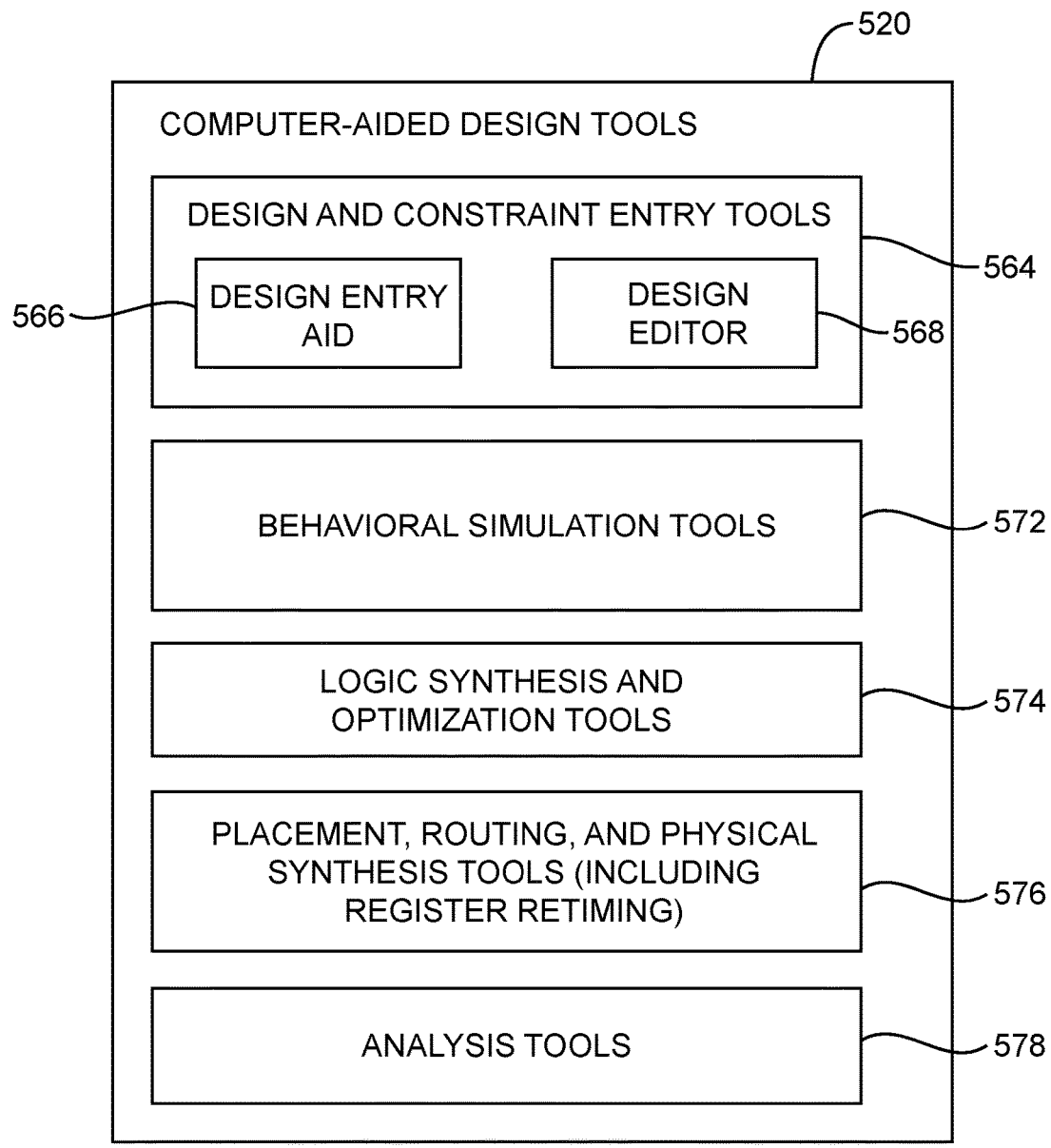
FIG. 5 is a diagram of illustrative computer-aided design (CAD) tools that may be used in a circuit design system in accordance with an embodiment.

Illustrative computer aided design tools 520 that may be used in a circuit design system such as circuit design system 400 of FIG. 4 are shown in FIG. 5.

The design process may start with the formulation of functional specifications of the integrated circuit design (e.g., a functional or behavioral description of the integrated circuit design). A circuit designer may specify the functional operation of a desired circuit design using design and constraint entry tools 564. Design and constraint entry tools 564 may include tools such as design and constraint entry aid 566 and design editor 568. Design and constraint entry aids such as aid 566 may be used to help a circuit designer locate a desired design from a library of existing circuit designs and may provide computer-aided assistance to the circuit designer for entering (specifying) the desired circuit design.

As an example, design and constraint entry aid 566 may be used to present screens of options for a user. The user may click on on-screen options to select whether the circuit being designed should have certain features. Design editor 568 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 564 may be used to allow a circuit designer to provide a desired circuit design using any suitable format. For example, design and constraint entry tools 564 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 564 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 564 may allow the circuit designer to provide a circuit design to the circuit design system 400 using a hardware description language such as Verilog hardware description language (Verilog HDL), Very High Speed Integrated Circuit Hardware Description Language (VHDL), SystemVerilog, or a higher-level circuit description language such as OpenCL or SystemC, just to name a few. The designer of the integrated circuit design can enter the circuit design by writing hardware description language code with editor 568. Blocks of code may be imported from user-maintained or commercial libraries if desired.

After the design has been entered using design and constraint entry tools 564, behavioral simulation tools 572 may be used to simulate the functional performance of the circuit design. If the functional performance of the design is incomplete or incorrect, the circuit designer can make changes to the circuit design using design and constraint entry tools 564. The functional operation of the new circuit design may be verified using behavioral simulation tools 572 before synthesis operations have been performed using tools 574. Simulation tools such as behavioral simulation tools 572 may also be used at other stages in the design flow if desired (e.g., after logic synthesis). The output of the behavioral simulation tools 572 may be provided to the circuit designer in any suitable format (e.g., truth tables, timing diagrams, etc.).

Once the functional operation of the circuit design has been determined to be satisfactory, logic synthesis and optimization tools 574 may generate a gate-level netlist of the circuit design, for example using gates from a particular library pertaining to a targeted process supported by a foundry, which has been selected to produce the integrated circuit. Alternatively, logic synthesis and optimization tools 574 may generate a gate-level netlist of the circuit design using gates of a targeted programmable logic device (i.e., in the logic and interconnect resources of a particular programmable logic device product or product family).

Logic synthesis and optimization tools 574 may optimize the design by making appropriate selections of hardware to implement different logic functions in the circuit design based on the circuit design data and constraint data entered by the logic designer using tools 564. As an example, logic synthesis and optimization tools 574 may perform register retiming on the circuit design based on the length of a combinational path between registers in the circuit design and corresponding timing constraints that were entered by the logic designer using tools 564.

After logic synthesis and optimization using tools 574, the circuit design system may use tools such as placement, routing, and physical synthesis tools 576 to perform physical design steps (layout synthesis operations). Tools 576 can be used to determine where to place each gate of the gate-level netlist produced by tools 574. For example, if two counters interact with each other, tools 576 may locate these counters in adjacent regions to reduce interconnect delays or to satisfy timing requirements specifying the maximum permitted interconnect delay. Tools 576 create orderly and efficient implementations of circuit designs for any targeted integrated circuit (e.g., for a given programmable integrated circuit such as a field-programmable gate array (FPGA)).

Tools such as tools 574 and 576 may be part of a compiler suite (e.g., part of a suite of compiler tools provided by a programmable logic device vendor). In certain embodiments, tools such as tools 574, 576, and 578 may also include timing analysis tools such as timing estimators. This allows tools 574 and 576 to satisfy performance requirements (e.g., timing requirements) before actually producing the integrated circuit.

As an example, tools 574 and 576 may perform register retiming by moving registers through combinational logic (e.g., through logic AND, OR, XOR, and other suitable gates, look-up tables (LUTs), multiplexers, arithmetic operators, etc.). Tools 574 and 576 may push registers forward or backward across combinational logic as illustrated in FIG. 2. If desired, tools 574 and 576 may perform forward and backward pushes of registers by configuring pipelined routing resources such as pipelined routing resource 300 of FIG. 3 to operate in non-pipeline mode or as a pipelined routing element. Physical synthesis tools 576 used in this way can therefore also be used to perform register retiming.

After an implementation of the desired circuit design has been generated using tools 576, the implementation of the design may be analyzed and tested using analysis tools 578. For example, analysis tools 578 may include timing analysis tools, power analysis tools, or formal verification tools, just to name few.

After satisfactory optimization operations have been completed using tools 520 and depending on the targeted integrated circuit technology, tools 520 may produce a mask-level layout description of the integrated circuit or configuration data for programming the programmable logic device.

Figure 6:
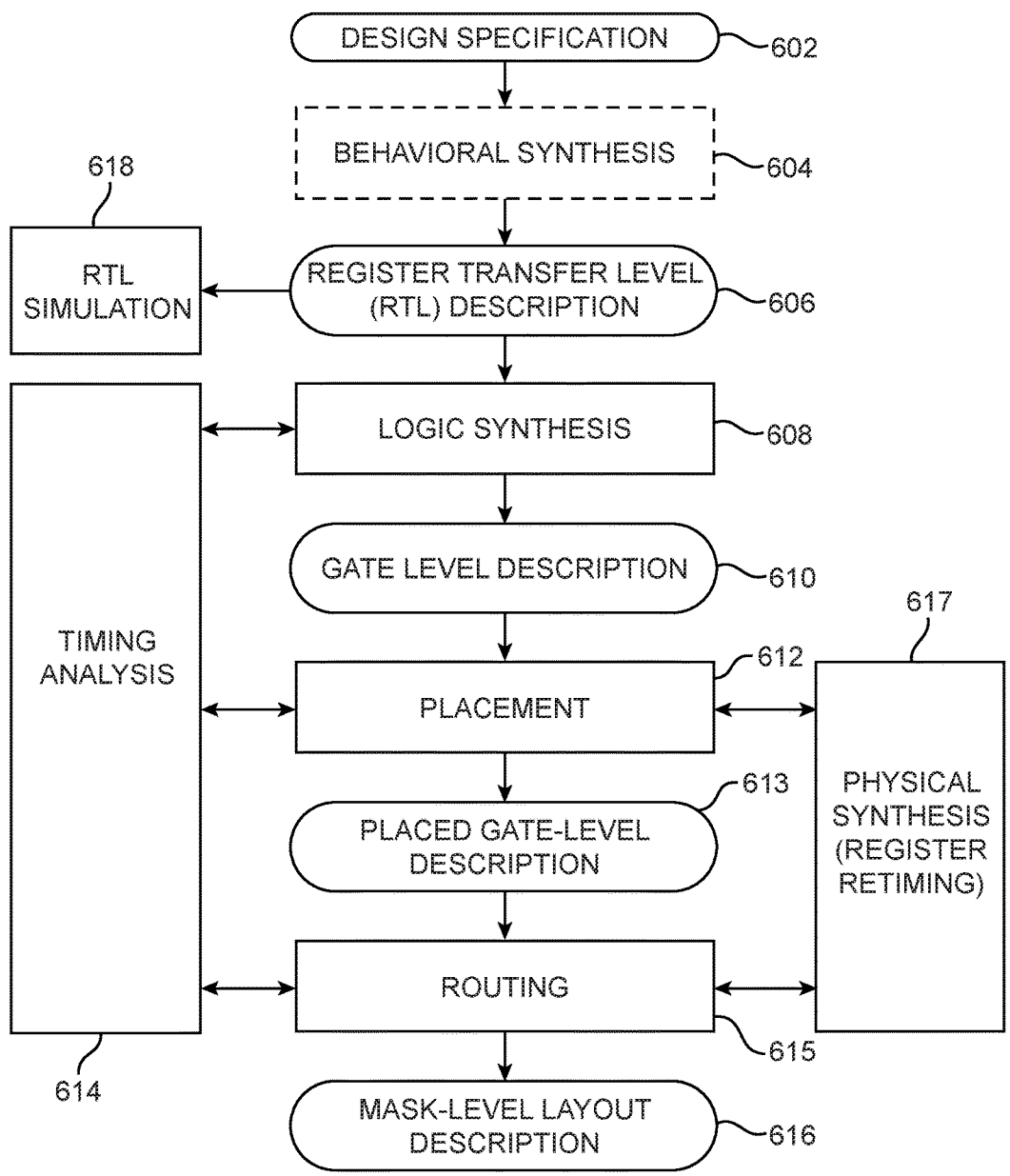
FIG. 6 is a flow chart of illustrative steps for designing an integrated circuit in accordance with an embodiment.

Illustrative operations involved in using tools 520 of FIG. 5 to produce the mask-level layout description of the integrated circuit are shown in FIG. 6. As shown in FIG. 6, a circuit designer may first provide a design specification 602. The design specification 602 may, in general, be a behavioral description provided in the form of an application code (e.g., C code, C++ code, SystemC code, OpenCL code, etc.). In some scenarios, the design specification may be provided in the form of a register transfer level (RTL) description 606.

The RTL description may have any form of describing circuit functions at the register transfer level. For example, the RTL description may be provided using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL). If desired, a portion or all of the RTL description may be provided as a schematic representation.

In general, the behavioral design specification 602 may include untimed or partially timed functional code (i.e., the application code does not describe cycle-by-cycle hardware behavior), whereas the RTL description 606 may include a fully timed design description that details the cycle-by-cycle behavior of the circuit at the register transfer level.

Design specification 602 or RTL description 606 may also include target criteria such as area use, power consumption, delay minimization, clock frequency optimization, or any combination thereof. The optimization constraints and target criteria may be collectively referred to as constraints.

Those constraints can be provided for individual data paths, portions of individual data paths, portions of a design, or for the entire design. For example, the constraints may be provided with the design specification 602, the RTL description 606 (e.g., as a pragma or as an assertion), in a constraint file, or through user input (e.g., using the design and constraint entry tools 564 of FIG. 5), to name a few.

At step 604, behavioral synthesis (sometimes also referred to as algorithmic synthesis) may be performed to convert the behavioral description into an RTL description 606. Step 604 may be skipped if the design specification is already provided in form of an RTL description.

At step 618, behavioral simulation tools 572 may perform an RTL simulation of the RTL description, which may verify the functional performance of the RTL description. If the functional performance of the RTL description is incomplete or incorrect, the circuit designer can make changes to the HDL code (as an example). During RTL simulation 618, actual results obtained from simulating the behavior of the RTL description may be compared with expected results.

During step 608, logic synthesis operations may generate gate-level description 610 using logic synthesis and optimization tools 574 from FIG. 5. If desired, logic synthesis operations may perform register retiming as illustrated in FIG. 2 according to the constraints that are included in design specification 602 or RTL description 606. The output of logic synthesis 608 is gate-level description 610.

During step 612, placement operations using for example placement tools 576 of FIG. 5 may place the different gates in gate-level description 610 in a preferred location on the targeted integrated circuit to meet given target criteria (e.g., minimize area and maximize routing efficiency or minimize path delay and maximize clock frequency or any combination thereof). The output of placement 612 is placed gate-level description 613.

During step 615, routing operations using for example routing tools 576 of FIG. 5 may connect the gates from the placed gate-level description 613. Routing operations may attempt to meet given target criteria (e.g., minimize congestion, minimize path delay and maximize clock frequency or any combination thereof). The output of routing 615 is a mask-level layout description 616 (sometimes referred to as routed gate-level description 616).

While placement and routing is being performed at steps 612 and 615, physical synthesis operations 617 may be concurrently performed to further modify and optimize the circuit design (e.g., using physical synthesis tools 576 of FIG. 5). If desired, register retiming operations may be performed during physical synthesis step 617. For example, registers in the placed gate-level description 613 or the routed gate-level description 616 may be moved around according to the constraints that are included in design specification 602 or RTL description 606. As an example, register retiming operations may change the configuration of some pipelined routing resources (e.g., some instances of pipelined routing resource 300 of FIG. 3) from operating in pipeline register mode to operating in non-pipelined mode and the configuration of other pipelined routing resources (e.g., other instances of pipelined routing resources 300 of FIG. 3) from operating in non-pipelined mode to operating in pipeline register mode.

In accordance with an embodiment of the present invention, circuit design system 400 can sometimes be used to retime integrated circuits that include different types of digital latches. Retiming integrated circuits designs having different types of latches can oftentimes be challenging. Registers that are being pushed around during retiming (e.g., register 306 shown in FIG. 3 which can be selectively bypassed or switched into use) are often implemented using digital latches sometimes referred to as flip-flop circuits.

Figure 7A:
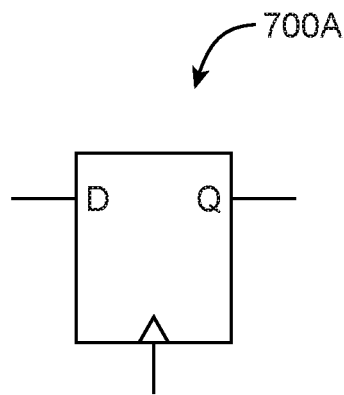
FIG. 7A is a diagram of a simple flip-flop.

FIG. 7A is a diagram of a simple flip-flop such as flip-flop 700A. Flip-flop 700A may have a data input D, a data output Q, and a clock input. Flip-flop 700A may be a positive-clock-edge-triggered flip-flop. In other words, the value of a data signal that is presented to data input D when a clock signal received at the clock input rises high will be latched by flip-flop 700A. The latched data value will then be held at data output Q of flip-flop 700A until at least the next rising clock edge of the clock signal. Flip-flop 700A is not provided with any secondary signals.

Figure 7B:
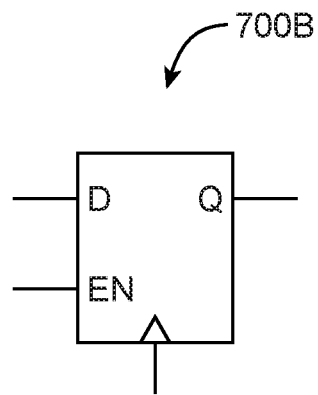
FIG. 7B is a diagram of a flip-flop with a clock enable secondary input in accordance with an embodiment.

In accordance with a variation, flip-flops can sometimes be provided with a secondary signal such as a clock enable signal (see, e.g., FIG. 7B). As shown in FIG. 7B, flip-flop 700B may have data input D, data output Q, a clock input, and also a clock enable input EN for receiving a clock enable signal. When the clock enable signal is asserted, flip-flop 700B is allowed to latch incoming data at either the rising clock edge (if flip-flop 700B is a rising-clock-edge-triggered latch) or the falling clock edge (if flip-flop 700B is a falling-clock-edge-triggered latch). When the clock enable signal is deasserted, flip-flop 700B is configured to hold its current value by ignoring the value at data input D (e.g., flip-flop 700B will retain its current state whether or not the clock signal toggles).

Figure 7C:
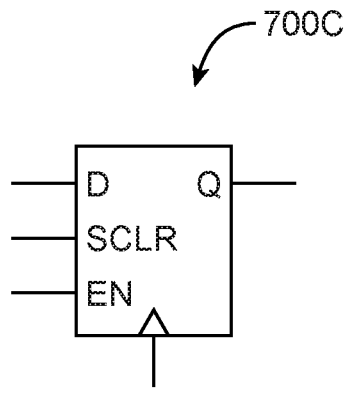
FIG. 7C is a diagram of a flip-flop with clock enable and synchronous clear secondary inputs in accordance with an embodiment.

In accordance with another variation, FIG. 7C shows a flip-flop that receives two secondary signals such as a clock enable signal and a synchronous clear signal. As shown in FIG. 7C, flip-flop 700C may have data input D, data output Q, a clock input, a clock enable input EN, and a synchronous clear input SCLR. The clock enable input of flip-flop 700C operates in a similar way as that described in connection with flip-flop 700B and need not be described in detailed again. The synchronous clear input may be used to effectively gate the input data signal. For example, if the synchronous clear signal is deasserted, the input data signal—whatever its current value may be—can be latched by flip-flop 700C in response to a rising or falling clock edge. However, if the synchronous clear signal is asserted, flip-flop 700C will only be able to latch a default logic "0" at its input in response to a rising/falling clock edge. The default clear value of logic "0" is merely illustrative. If desired, the default clear value may instead be set to a logic "1" whenever the synchronous clear signal is asserted.

Figure 7D:
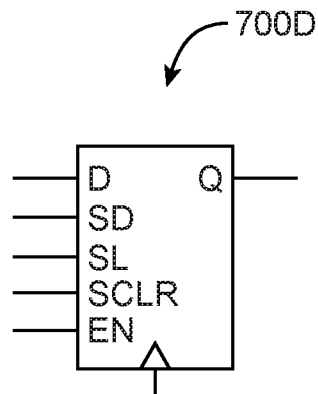
FIG. 7D is a diagram of a flip-flop with clock enable, synchronous clear, synchronous data, and synchronous load secondary inputs in accordance with an embodiment.

In accordance with yet another variation, FIG. 7D shows a flip-flop that receives more than two secondary signals such as a clock enable signal, a synchronous clear signal, a synchronous data signal, and a synchronous load signal. As shown in FIG. 7D, flip-flop 700D may have data input D, data output Q, a clock input, a clock enable input EN, a synchronous clear input SCLR, a synchronous data input SD, and a synchronous load input SL. The clock enable input and the synchronous clear input of flip-flop 700D operate in a similar way as that described in connection with flip-flop 700C and need not be described in detailed again.

The synchronous data input and the synchronous load input may operate in the following way: whenever a synchronous load signal at the synchronous load input is asserted, only the synchronous data signal presented at the synchronous data input can be latched by flip-flop 700D; however, whenever the synchronous load is deasserted, only the normal data input signal at input D (instead of the synchronous data signal) can be latched by flip-flop 700D. The synchronous load signal therefore serves as a control signal that selected between either the normal data input signal or the synchronous data input signal.

Figure 8A:
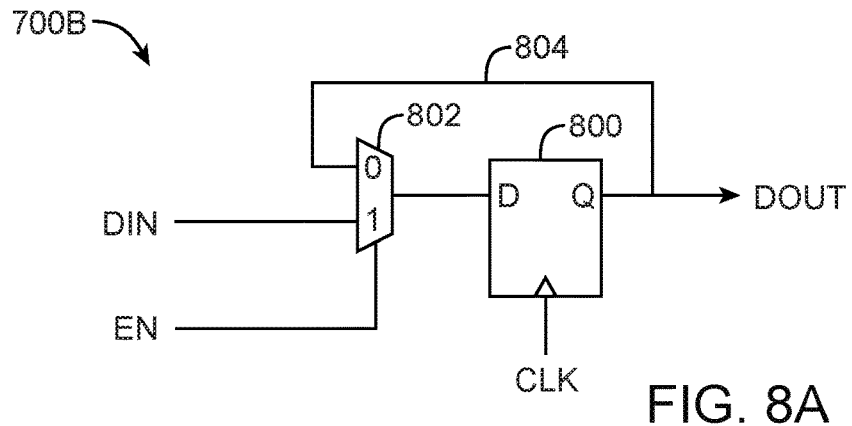
FIG. 8A is a diagram showing how the flip-flop of FIG. 7B can be modeled in accordance with an embodiment.

For retiming purposes, flip-flops with secondary signals (sometimes referred to as "complex" flip-flops as opposed to simple flip-flops) sometimes need to be modeled using gate-level combinational logic and a simple flip-flop. FIG. 8A is a diagram showing how flip-flop 700B can be modeled in accordance with an embodiment. As shown in FIG. 8A, flip-flop 700B can be modeled using an underlying simple digital flip-flop 800 and a multiplexing circuit such as 2:1 multiplexer 802. In particular, multiplexer 802 may have a first (0) input that is connected to the data output terminal of flip-flop 800, a second (1) input that receives input data signal DIN, a control input that receives clock enable signal EN, and an output that is connected to the data input terminal of flip-flop 800. Arranged in this way, flip-flop 700B is configured to latch a new input signal DIN in response to detecting a rising clock edge in clock signal CLK whenever signal EN is high or is configured to hold its current state if signal EN is low (e.g., output signal DOUT will stay constant regardless of whether signal CLK is toggling).

Figure 8B:
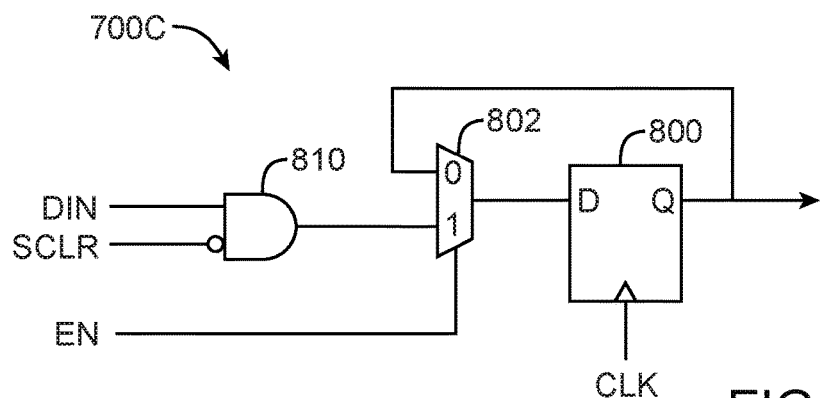
FIG. 8B is a diagram showing how the flip-flop of FIG. 7C can be modeled in accordance with an embodiment.

FIG. 8B is a diagram showing how flip-flop 700C can be modeled in accordance with an embodiment. As shown in FIG. 8B, the clock enable input is modeled in the same way as described in connection with FIG. 8A (e.g., using multiplexer 802 connected in a feedback arranged with register 800). Moreover, FIG. 8B shows how the synchronous clear input can be modeled using a combinational logic gate such as logic AND gate 810. In particular, gate 810 has a first (non-inverting) input that receives normal data input signal DIN, a second (inverting) input that receives synchronous clear input signal SCLR, and an output that is connected to the second (1) input of multiplexer 802. Arranged in this way, flip-flop 700C can be configured to force the input data to ground whenever signal SCLR is high (since the second input is an inverting input). In other suitable arrangements, gate 810 might be replaced by a logic OR gate to implement a function that forces the input data to a positive power supply level whenever signal SCLR is high.

Figure 8C:
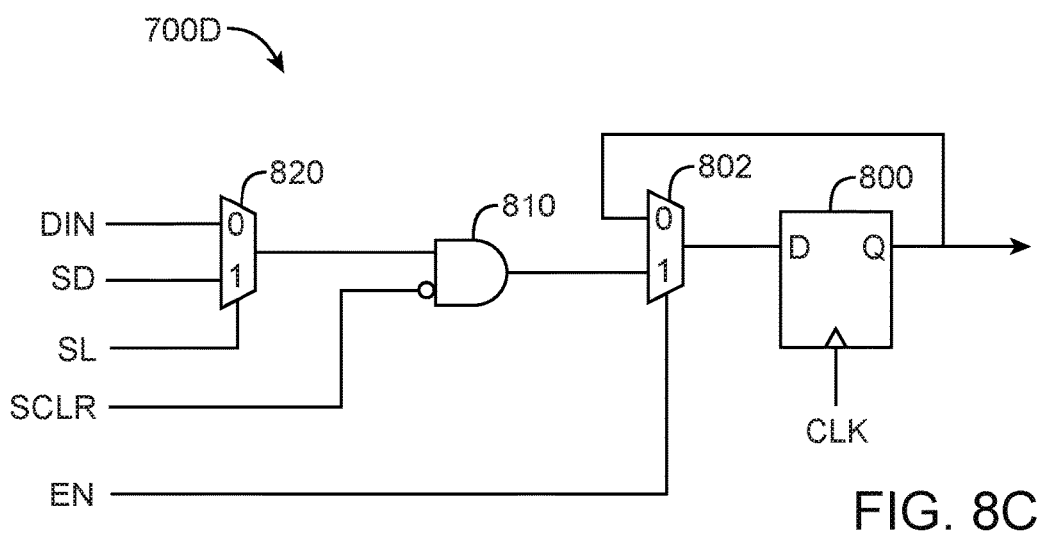
FIG. 8C is a diagram showing how the flip-flop of FIG. 7D can be modeled in accordance with an embodiment.

FIG. 8C is a diagram showing how flip-flop 700D can be modeled in accordance with an embodiment. As shown in FIG. 8C, the clock enable input and the synchronous clear input can be modeled in the same way as described in connection with FIG. 8B (e.g., using multiplexer 802 and logic gate 810). Moreover, FIG. 8C shows how the synchronous data input and the synchronous load input can be modeled using a multiplexing circuit such as 2:1 multiplexer 820. In particular, multiplexer 820 has a first (0) input that receives normal input data signal DIN, a second input (1) that receives synchronous data input signal SD, a control input that receives synchronous load input signal SL, and an output that is connected to the first input of gate 810. Coupled in this way, flip-flop 700D can be configured to pass through signal DIN whenever synchronous load signal SL is low or to pass through signal CD whenever synchronous load signal SL is high.

In general, retiming operations become challenging when different types of flip-flops need to be backwards retimed across a singular fan-out node or forwards retimed across a singular fan-in node. For example, consider a scenario in which a combinational logic block feeds a fan-out node that is connected to two downstream flip-flops. If the two flip-flops have a different number of secondary signals, the flip-flop with more secondary signals may be modeled to match the flip-flop with fewer secondary signals. However, the two flip-flops need not be completely modeled using simple flip-flops. In accordance with an embodiment, selective modeling can be performed on the flip-flop with more secondary signals so that only a minimum number of secondary signals need to be modeled. Selectively modelling of heterogeneous complex flip-flops can help solve this retiming issue without incurring much area overhead while meeting performance targets.

Some secondary signals may have higher precedence over others for retiming purposes. If the synchronous data input and the synchronous load input are the only two signals that are different among two or more flip-flops that are candidates for retiming, then only those two signals will be modeled using multiplexer 820 (FIG. 8C) for the flip-flop(s) that have those signals. In this scenario, all other secondary signals should not be modeled.

If the synchronous clear input is the only signal that is different among two or more flip-flops that are candidates for retiming, then all flip-flops either have the synchronous data input and the synchronous load input or they don't. If the flops have these two signals (e.g., signals SD and SL), then for all such flip-flops, the synchronous data and synchronous load are modeled using multiplexor 820. For the flip-flops that have synchronous clear, the synchronous clear is also modeled using gate 810 (FIG. 8B). In this scenario, if all candidate flip-flops have clock enables, then the clock enable is not modeled for any of the flip-flops.

If the clock enable input is the only signal that is different among two or more candidate flip-flops for retiming, then all flip-flops may have synchronous data and synchronous load and/or synchronous clear. All of these secondary signals have to be modeled in this case. For thee flip-flops that have clock enable, the clock enable input can be modeled using multiplexer 802 (FIG. 8A).

This selective hierarchical modeling scheme gives the clock enable signal the highest precedence. The synchronous clear signal has the next highest level of precedence. The synchronous data and the synchronous load signals have the lowest precedence. In other words, whenever the difference between heterogeneous flip-flops involves a clock enable, then the clock enable signal and all other secondary signals for all candidate flip-flops need to be modeled. However, whenever the difference between heterogeneous flip-flops involves only a synchronous clear, then the synchronous clear signal and all other secondary signals with lower precedence for all candidate flip-flops will need to be modeled. Lastly, whenever the difference between heterogeneous flip-flops involves only the synchronous data/load, then only flip-flops with those signals need to be modeled (i.e., all other secondary signal need not be modeled).

Figure 9A:
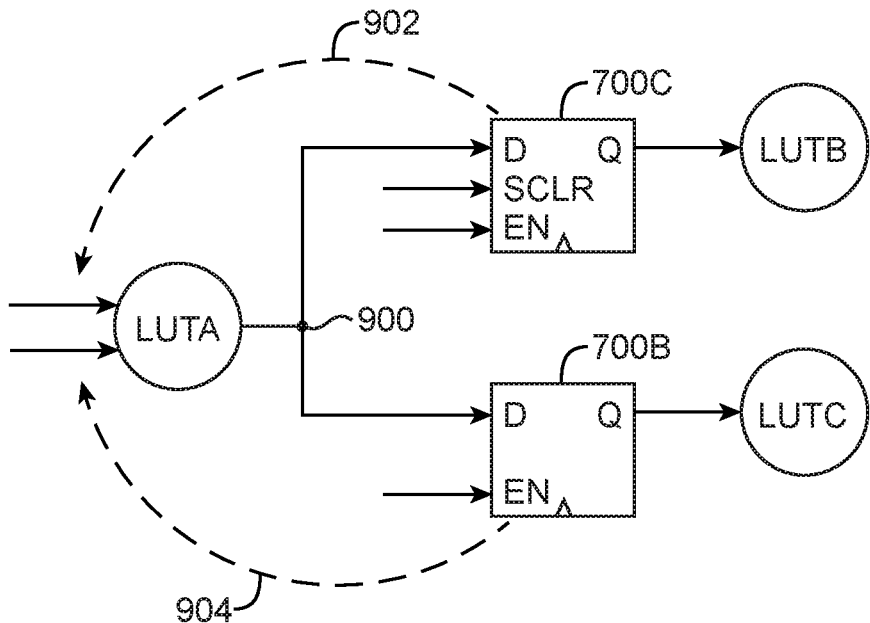
FIGS. 9A-9D are diagrams illustrating a backward retiming operation by selectively modeling flip-flops with secondary signals in accordance with an embodiment.

This selective modeling scheme can be applied to both backward register retiming and/or forward register retiming operations. FIGS. 9A-9D are diagrams illustrating a backward retiming operation by selectively modeling heterogeneous complex flip-flops. Combinational logic is often implemented using lookup tables (LUTs) on a programmable integrated circuit. In the example of FIG. 9A, first combinational logic, implemented using a first lookup table LUTA, may have at least first and second input paths and an output 900 that fans out to two heterogeneous downstream flip-flops 700C and 700B. Flip-flop 700C may output to second combinational logic (implemented using a second lookup table LUTB), whereas flip-flop 700B may output to third combinational logic (implemented using a third lookup table LUTC).

In order to retime flip-flops 700C and 700B backwards across logic LUTA (as indicated by dotted arrows 902 and 904), both flip-flops need to be of the same/comparable type (e.g., candidate registers for retiming need to be selectively modeled such that the number of secondary signals is equivalent). In this particular example, the only difference between the two flip-flops is that flip-flop 700C has an extra synchronous clear input. Since the remaining secondary signal (i.e., the clock enable signal) has the highest precedence, the clock enable input need not be modeled.

Figure 9B:
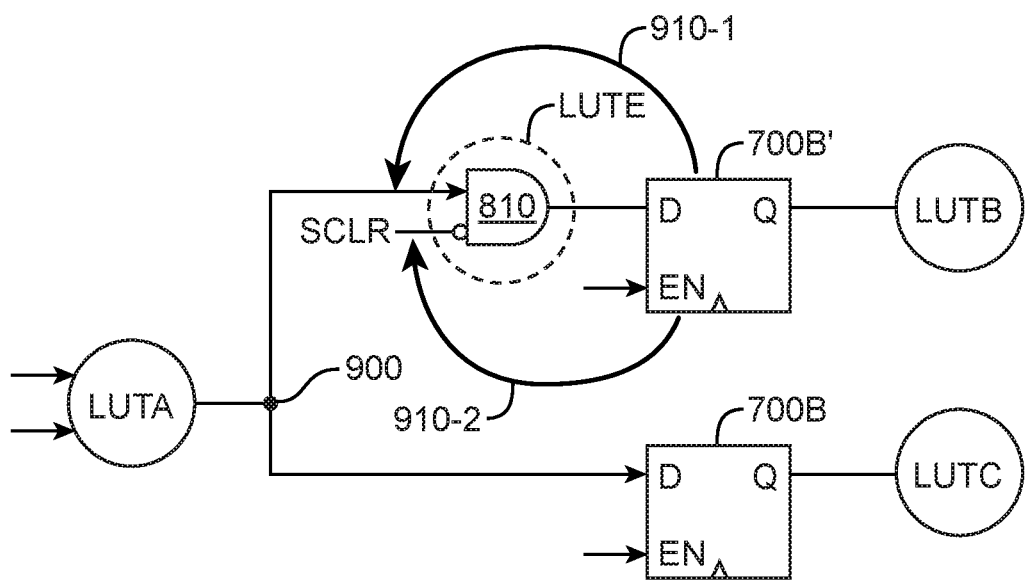

The selective modeling step is illustrated in FIG. 9B. As shown in FIG. 9B, the synchronous clear input of flip-flop 700C can be modeled using complex flip-flop 700B' (e.g., a flip-flop having a clock enable input to match that of flip-flop 700B in the other downstream path) and logic AND gate 810 at the data input of flip-flop 700B'. Logic AND gate 810 can also be implemented using logic resources such as lookup table LUTE. In order to perform backwards retiming across logic LUTA, both flip-flops 700B' and 700B need to be directly connected to fan-out node 900. Thus, flip-flop 700B' may first be retimed across logic LUTE, as indicated by arrows 910-1 and 910-2.

Figure 9C:
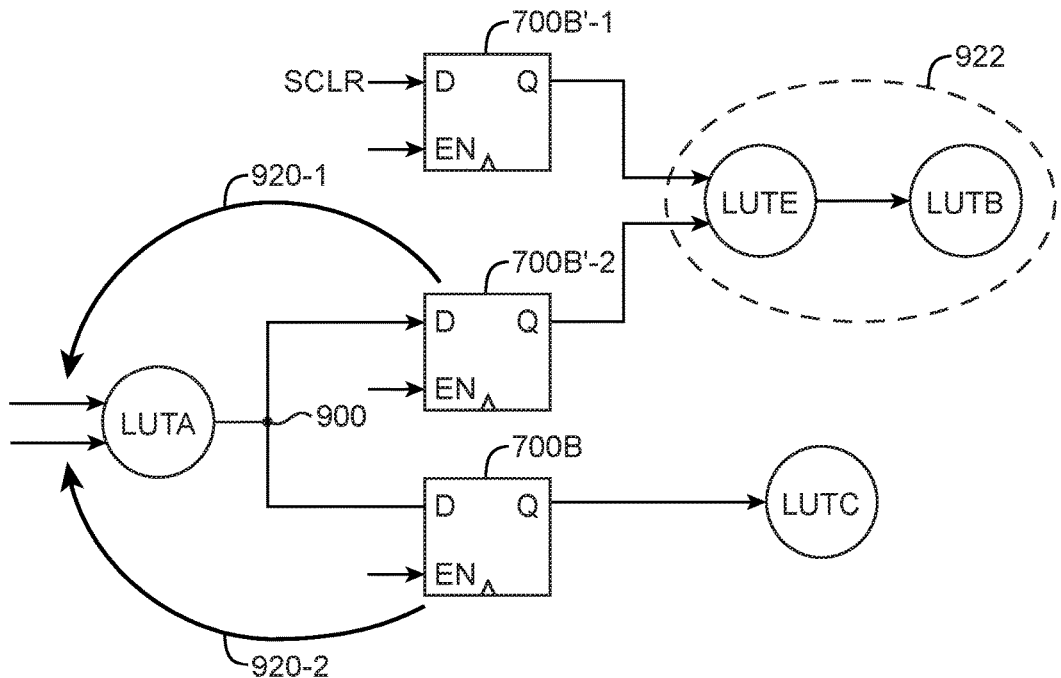

FIG. 9C shows the resulting circuit after flip-flop 700B' has been retimed across logic LUTE. As shown in FIG. 9C, flip-flop 700B'-1 may be inserted at the first input of logic LUTE, whereas flip-flop 700B'-2 may be inserted at the second input of logic LUTE. Flip-flop 700B'-1 may be a complex flip-flop having a clock enable input that receives synchronous clear signal SCLR at its data input, whereas flip-flop 700B'-2 may be a complex flip-flop having a clock enable input that is now directly connected to fan-out node 900.

Now that two comparable flip-flops 700B'-2 and 700B (e.g., both fan-out registers are homogeneous and have exactly the same secondary signal(s)) are present at fan-out node 900, they can be retimed across logic LUTA (as indicated by arrows 920-1 and 920-2). In actuality, both flip-flops 700B'-2 and 700B may first be merged or simplified into a single flip-flop, which is then placed before fan-out node 900; the merged flip-flop can then be retimed across logic LUTA. In the example of FIG. 9C, logic LUTE and LUTB may be optionally combined into a single LUT as indicated by dotted portion 922 (see, e.g., table LUTG of FIG. 9D) to further optimize resource utilization. This LUT merging is performed to the extent allowed by the FPGA device architecture while satisfying legality rules associated with the FPGA and other design constraints. Combined in this way, immediately adjacent combinational logic can be implemented using a shared lookup table rather than two separate lookup tables (assuming the shared lookup table has sufficient capability to implement the functions of both LUTE and LUTB) to help minimize area.

Figure 9D:
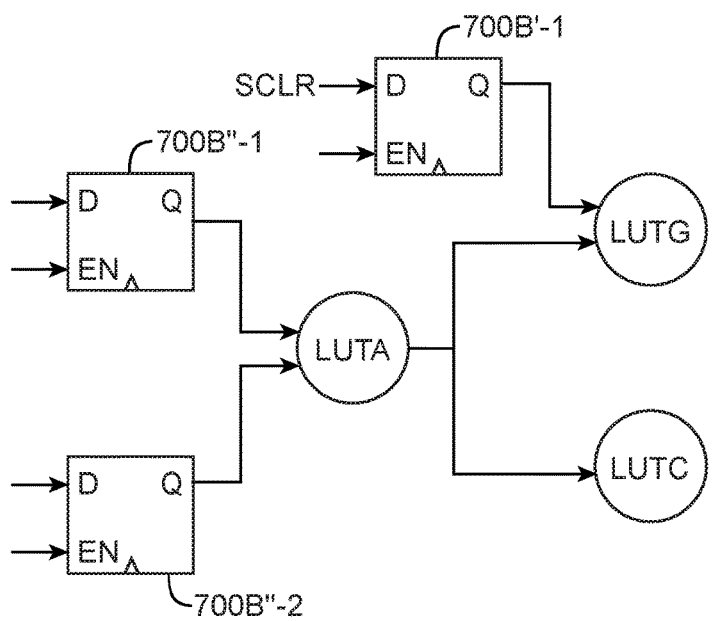

FIG. 9D shows the resulting circuit after retiming the registers across logic LUTA. As shown in FIG. 9D, flip-flop 700B"-1 may be inserted at the first input of logic LUTA, whereas flip-flop 700B"-2 may be inserted as the second input of logic LUTB. At this point, the backward retiming operation is complete. The exemplary steps shown in FIGS. 9A-9D in which two heterogeneous registers are backwards retimed across a logic fan-out node is merely illustrative and is not intended to limit the scope of the present invention. If desired, three or more heterogeneous flip-flops can be selectively modeled and retimed across a fan-out logic with two or more inputs in the way described above using the secondary signals precedence rules.

Figure 10A:
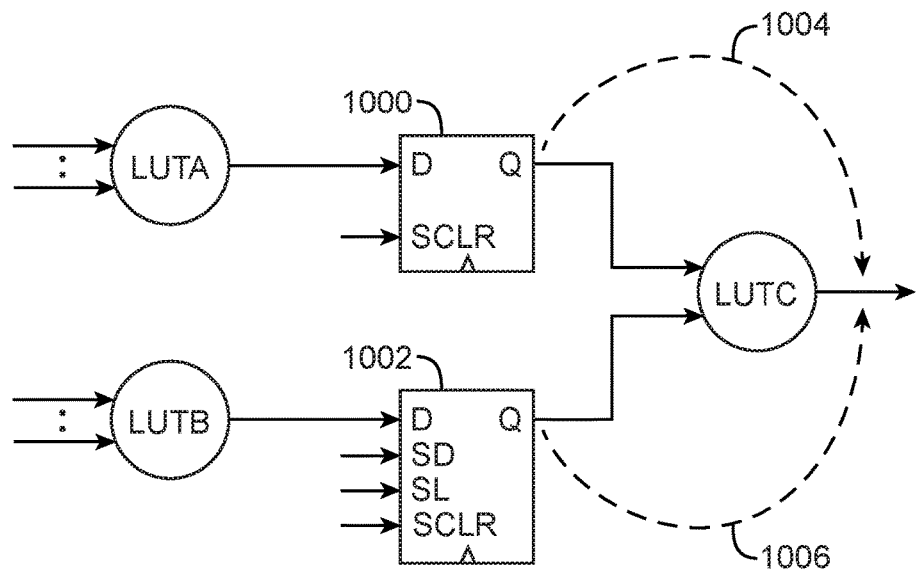
FIGS. 10A-10C are diagrams illustrating a forward retiming operation by selectively modeling flip-flops with secondary signals in accordance with an embodiment.

FIGS. 10A-10D are diagrams illustrating a forward retiming operation by selectively modeling heterogeneous complex flip-flops. In the example of FIG. 10A, first flip-flop 1000 may be connected between first combinational logic (implemented using first lookup table LUTA) and a first input of combinational logic LUTC, whereas second flip-flop 1002 may be connected between second combinational logic (implemented using second lookup table LUTB) and a second input of logic LUTC. Lookup tables LUTA and LUTB may each receive one or more input signals.

In order to retime flip-flops 1000 and 1002 forwards across logic LUTC (as indicated by dotted arrows 1004 and 1006), both flip-flops need to be of the same/comparable type (e.g., candidate registers for retiming need to be selectively modeled such that the number of secondary signals is equivalent). In this particular example, the only difference between the two flip-flops is that flip-flop 1002 has an extra synchronous data input and an extra synchronous load input. Since the remaining secondary signal (i.e., synchronous clear signal) has a higher precedence, the synchronous clear input need not be modeled.

Figure 10B:
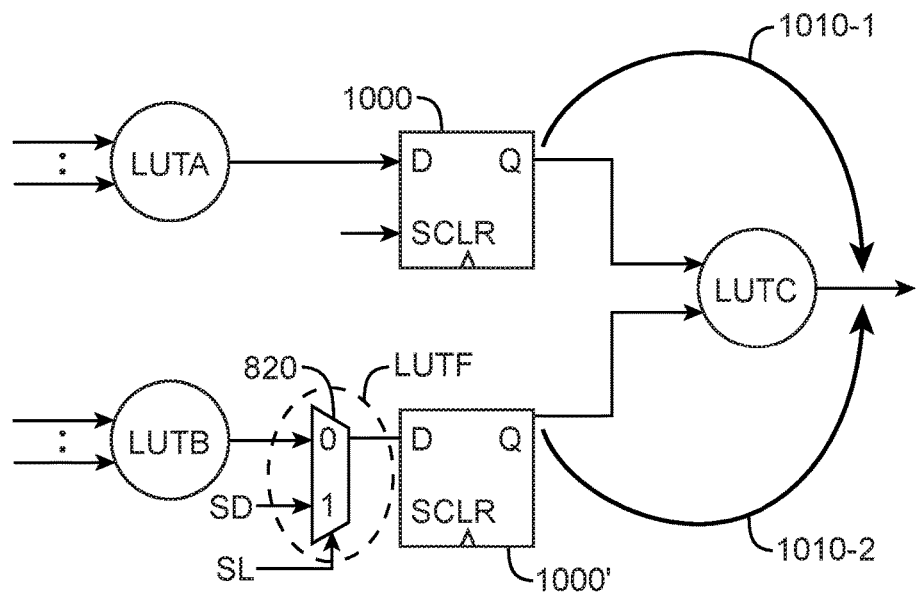
Figure 10C:
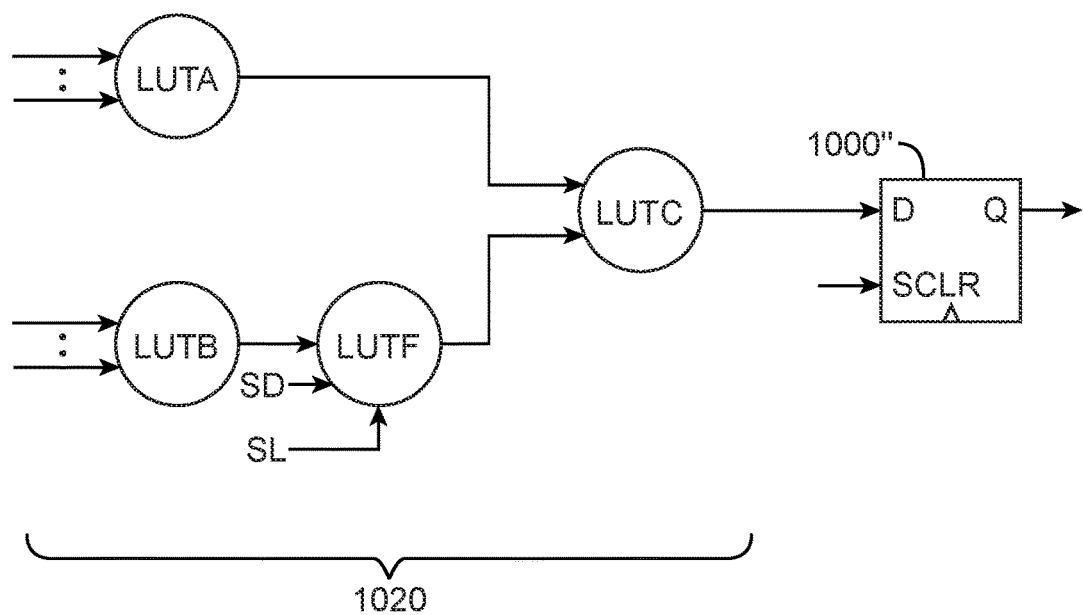

The selective modeling step is illustrated in FIG. 10B. As shown in FIG. 10B, the synchronous data/load inputs of flip-flop 1002 can be selectively modeled using complex flip-flop 1000' (e.g., a flip-flop having a synchronous clear input to match that of flip-flop 1000 in the other input path) and multiplexer 820 at the data input of flip-flop 1000'. Multiplexer 820 can also be implemented using logic resources such as lookup table LUTF. As shown in FIG. 10C, LUTF may have an input that receives a signal from LUTB and also inputs that receive the synchronous data and load signals.

Now that two comparable flip-flops 1000 and 1000' (e.g., both fan-in registers are homogeneous and have exactly the same secondary signal(s)) are present at the input of logic LUTC, they can be retimed across logic LUTC (as indicated by arrows 1010-1 and 1010-2). FIG. 10C shows the resulting circuit after retiming the registers across logic LUTC. As shown in FIG. 10C, a single flip-flop 1000" may be inserted at the output of logic LUTC. At this point, the forward retiming operation is complete. If desired, any combination of two or more adjacent logic/LUT in region 1020 may be optionally combined into a single LUT to further optimize resource utilization and minimize area.

The exemplary steps shown in FIGS. 10A-10C in which two heterogeneous registers are forwards retimed across a logic fan-in node is merely illustrative and is not intended to limit the scope of the present invention. If desired, three or more heterogeneous flip-flops can be selectively modeled and retimed across a fan-in logic with two or more inputs in the way described above using the secondary signals precedence rules.

Figure 11:
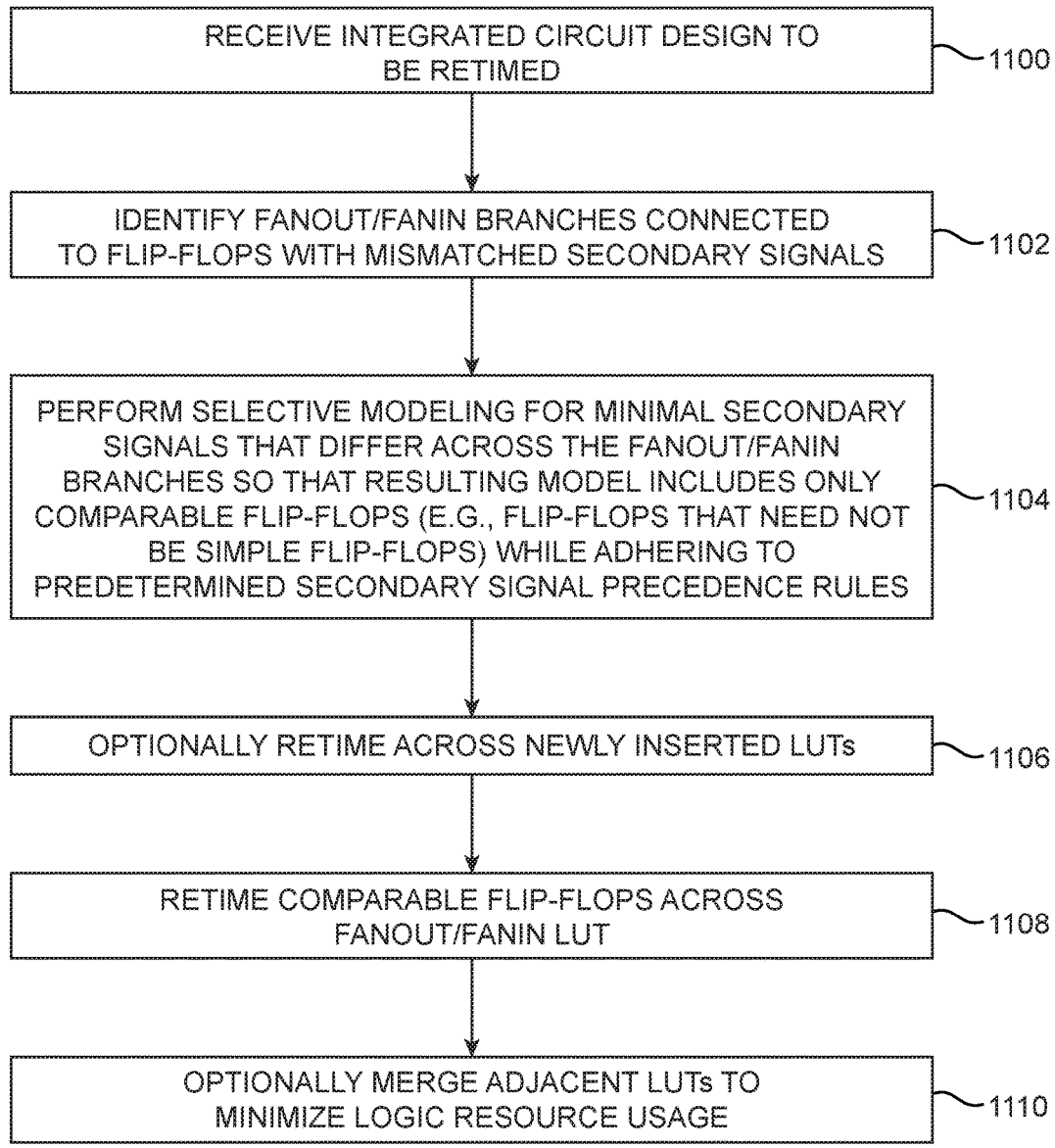
FIG. 11 is a flow chart of illustrative steps involved in performing selective modeling of complex flip-flops during a retiming operation in accordance with an embodiment.

FIG. 11 is a flow chart of illustrative steps involved in performing selective modeling of complex flip-flops during a retiming operation in accordance with an embodiment. At step 1100, CAD tools 420 (FIG. 4) may receive an integrated circuit design to be retimed. At step 1102, the CAD tools (e.g., logic synthesis and optimization tools and/or physical synthesis optimization tools 576 shown in FIG. 5) may be used to identify fan-out/fan-in branches connected to heterogeneous registers with mismatched secondary signals (e.g., flip-flops with a different number or type of secondary inputs).

At step 1104, the CAD tools may be used to perform selective modeling to remove a minimal number of secondary signals that differ among the candidate registers for retiming so that the resulting model includes only comparable registers. The comparable registers need not be simple flip-flops; the comparable registers can be complex flip-flops with one or more of the same secondary signals. The selective model should adhere to predetermined secondary signal precedence rules. For example, the clock enable signal might have the highest modeling precedence, whereas the synchronous data/load might have the lowest modeling precedence. This particular order of precedence is merely exemplary. If desired, other precedence ordering of secondary signals may be used to help further optimize logic resource utilization.

At step 1106, one or more of the new modeling registers may be optionally retimed across some combinational logic, as shown in FIG. 9B. At this point, comparable registers should be presented at the fan-out/fan-in node of the LUT across which retiming is intended. At step 1108, the comparable registers are then retimed across the fan-out/fan-in lookup table (see, e.g., FIG. 9C or FIG. 10B). Finally, adjacent LUTs (if any) can optionally be merged to minimize logic resource usage at step 1110, while adhering to the FPGA device architecture's legality rules. Retiming operations performed in this way can help provide minimal area overhead and better compile time, while achieve optimal circuit performance.

These steps are merely illustrative. The existing steps may be modified or omitted; some of the steps may be performed in parallel; additional steps may be added; and the order of certain steps may be reversed or altered.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IC circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/ INTEL Corporation.

The foregoing is merely illustrative of the principles of this invention and various modifications can be made by those skilled in the art. The foregoing embodiments may be implemented individually or in any combination.

What is claimed is:

1. A method of operating an integrated circuit design tool implemented on computing equipment, comprising:
   receiving a circuit design that includes a first register having a first data input, a first data output, a first clock input, and a first set of additional inputs respectively receiving a first set of secondary signals and a second register having a second data input, a second data output, a second clock input, and a second set of additional inputs that is different than the first set of additional inputs and that respectively receives a second set of secondary signals;
   updating the first register with the first set of additional inputs to a third register having a third set of additional inputs that respectively receives a third set of secondary signals and that matches the second set of additional inputs of the second register, wherein updating the first register comprises updating only a subset of the first set of secondary signals to produce the third register having the third set of secondary signals that matches the second set of secondary signals of the second register; and
   after the first register has been updated, performing a retiming operation on the circuit design with the third register.

2. The method of claim 1, wherein the first set of secondary signals includes a clock enable signal.

3. The method of claim 1, wherein the first set of secondary signals includes a synchronous clear signal.

4. The method of claim 1, wherein the first set of secondary signals includes a synchronous data signal and an associated synchronous load signal.

5. The method of claim 1, wherein the first and second registers are connected to a common fan-out node in the circuit design.

6. The method of claim 1, wherein the first and second registers feed a common combinational logic block in the circuit design.

7. A method of operating integrated circuit design computing equipment, comprising:
   receiving a circuit design that includes first and second candidate flip-flops for retiming;
   determining whether the first and second candidate flip-flops have matching secondary signals, wherein the secondary signals of the first and second candidate flip-flops include one or more secondary signals selected from the group consisting of: a clock enable signal, a synchronous clear signal, a synchronous data signal, and a synchronous load signal;
   in response to determining that the first and second candidate flip-flops have mismatched secondary signals, selectively updating the first and second candidate flip-flops; and
   after selectively updating the first and second candidate flip-flops, performing a register retiming operation for the first and second candidate flip-flops.

8. The method of claim 7, wherein the selectively updating the first and second candidate flip-flops comprises updating the mismatched signals in accordance with a predetermined secondary signal modeling precedence scheme.

9. The method of claim 8, wherein selectively updating the first and second candidate flip-flops comprises:
   in response to determining that the synchronous data signal and the synchronous load signal are the only two signals that are mismatched between the first and second candidate flip-flops, updating only those two signals while leaving all other secondary signals unchanged.

10. The method of claim 9, wherein updating the synchronous data signal and the synchronous load signal comprises using a multiplexer to receive a normal data signal at a first data input of the multiplexer, to receive the synchronous data signal at a second data input of the multiplexer, and to receive the synchronous load signal at a control input of the multiplexer.

11. The method of claim 8, wherein selectively updating the first and second candidate flip-flops comprises:
   in response to determining that the synchronous clear signal is the only signal that is mismatched between the first and second candidate flip-flops, updating the synchronous data and synchronous load signals of any candidate flip-flops having the synchronous data and synchronous load signals and also updating the synchronous clear signal.

12. The method of claim 11, wherein updating the synchronous clear signal comprises using a combinational logic gate to receive a normal data signal at a non-inverting input of the combinational logic gate and to receive the synchronous clear signal at an inverting input of the combinational logic gate.

13. The method of claim 8, wherein selectively updating the first and second candidate flip-flops comprises:
   in response to determining that the clock enable signal is the only signal that is mismatched between the first and second candidate flip-flops, updating each and every secondary signal in both of the first and second candidate flip-flops.

14. The method of claim 13, further comprising updating the clock enable signal using a multiplexer that receives a normal data signal at a first data input of the multiplexer, a previously latched data signal at a second data input of the multiplexer, and the clock enable signal at the control input of the multiplexer.

15. Non-transitory computer-readable storage media for performing register retiming operations on an integrated circuit design, comprising instructions for:
   receiving a circuit design that includes combinational logic, a first register that is connected to the combinational logic, and a second register that is connected to the combinational logic;
   determining whether the first and second registers have different secondary signals; and
   in response to determining that the first and second registers have different secondary signals, selectively modeling the secondary signals of the first and second registers according to a predetermined secondary signal modeling precedence rule, wherein the instructions for selectively modeling the secondary signals of the signal and second registers comprises instructions for producing comparable registers having the same number and type of secondary signals.

16. The non-transitory computer-readable storage media of claim 15, further comprising instructions for:

retiming the comparable registers across the combinational logic and across a fan-out node.

17. The non-transitory computer-readable storage media of claim 16, further comprising instructions for:

after retiming the comparable registers across the combinational logic, merging the combination logic with another adjacent combinational logic while adhering to legality rules associated with the underlying integrated circuit architecture.

* * * * *